United States Patent
Ha et al.

(10) Patent No.: US 8,844,119 B2
(45) Date of Patent: Sep. 30, 2014

(54) TECHNIQUE OF FIXING A PERMANENT MAGNET IN ROTOR

(75) Inventors: Jaewon Ha, Gyeonggi-Do (KR);
Jaeyoung Kie, Gyeonggi-Do (KR);
Jungwoo Lee, Gyeonggi-Do (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 0 days.

(21) Appl. No.: 13/315,889

(22) Filed: Dec. 9, 2011

(65) Prior Publication Data

US 2012/0324718 A1 Dec. 27, 2012

(30) Foreign Application Priority Data

Jun. 23, 2011 (KR) .................. 10-2011-0061230

(51) Int. Cl.
*H02K 1/27* (2006.01)
*H02K 15/03* (2006.01)

(52) U.S. Cl.
CPC .................................. *H02K 1/2766* (2013.01)
USPC .................. 29/598; 310/156.56; 335/284

(58) Field of Classification Search
CPC ............... H01F 13/003; H02K 1/274–1/2773;
H02K 15/03; H02K 15/12
USPC ............ 29/598; 310/156.53, 156.56; 335/284
See application file for complete search history.

(56) References Cited

U.S. PATENT DOCUMENTS

2006/0103254 A1* 5/2006 Horst ....................... 310/156.53
2007/0145849 A1* 6/2007 Okamoto et al. ........ 310/156.53

FOREIGN PATENT DOCUMENTS

| JP | 6315245 A | 11/1994 |
| JP | 2005-130553 A | 5/2005 |
| JP | 2005-287271 A | 10/2005 |
| JP | 2006-315345 A | 11/2006 |
| JP | 2008-245405 A | 10/2008 |
| JP | 2009-240111 A | 10/2009 |
| KR | 1997-0055073 | 7/1997 |
| KR | 10-2008-0028562 A | 4/2008 |

* cited by examiner

*Primary Examiner* — Livius R Cazan
(74) *Attorney, Agent, or Firm* — Edwards Wildman Palmer LLP; Peter F. Corless

(57) ABSTRACT

A technique for fixing permanent magnets of a drive motor rotor for a vehicle may include inserting permanent magnets into a plurality of permanent magnet insertion holes that are formed at a predetermined distance from each other in a circumferential direction of a rotor core, applying magnetic force to the rotor core with a magnetic force generator, such that the magnetic force is formed in an axial or a radial direction of the rotor core to instantly fix the position of the permanent magnets, and adding a fixation material to the permanent magnet insertion holes to fix the permanent magnets.

20 Claims, 5 Drawing Sheets

TECHNIQUE OF FIXING A PERMANENT MAGNET IN ROTOR

CROSS-REFERENCE TO RELATED APPLICATION

This application claims under 35 U.S.C. §119(a) priority to and the benefit of Korean Patent Application No. 10-2011-0061230, filed in the Korean Intellectual Property Office on Jun. 23, 2011, the entire contents of which are incorporated herein by reference.

BACKGROUND OF THE INVENTION (a) Field of the Invention

The present invention relates to a technique for fixing a permanent magnet in a rotor. More particularly, the present invention relates to a technique for fixing a permanent magnet in a rotor core of a drive motor of an electric or hybrid vehicle.

(b) Description of the Related Art

Generally, a hybrid electric vehicle (HEV) may utilize an engine and a drive motor as a power source. A HEV drive motor typically includes a stator, which is a coil wound around a stator core, and a rotor, which may contain a plurality of permanent magnets and is located within the stator core. The drive motor is powered by a high voltage battery that is separate from a 12 V battery.

A drive motor in a hybrid or electric vehicle is normally configured to output a high speed rotational torque. If the drive motor is a permanent magnet type, the permanent magnet is located in the rotor core, and the position of the permanent magnet is carefully fixed within the rotor core so as to maintain proper balance of the rotor.

Once the permanent magnet is inserted into a slot of the rotor core, it generates a stress-point within the core as a result of centrifugal force. If the permanent magnet slips out of the slot within the rotor core during operation of the drive motor as a result of this centrifugal force, the permanent magnet, the rotor core, or both, may be damaged or broken, thereby disabling the drive motor. Consequently, it is important to ensure that the position of the permanent magnet remains fixed within the rotor core.

To solve this problem, the conventional art normally uses a resin to fill in the slot around the permanent magnet, thereby fixing the permanent magnet within the slot and reducing the likelihood that the permanent magnet will slip, and damage or break the rotor core. Unfortunately, the application of the resin or the adhesive in this conventional art method has a major disadvantage because the process of filling the slot with the resin (including, for example, the filling method, the viscosity of the resin/adhesive, and/or the force of gravity) often alters the position of the permanent magnet within the slot of the rotor core. This alteration may cause an imbalance of the rotor assembly, which may decrease the electro-mechanical efficiency of the drive motor, cause abnormal wear on the drive motor, or result in abnormal noise and/or vibration.

The above information disclosed in this Background section is only for enhancement of understanding of the background of the invention.

SUMMARY OF THE INVENTION

The present invention provides a technique for fixing a permanent magnet in a rotor core when a drive motor for a hybrid vehicle is fabricated. The present invention also provides a technique for improving the performance of a rotor by fixing a permanent magnet in a rotor core before filling a filling member in a permanent magnet insertion hole. The present invention further provides a technique for improving the performance of a drive motor by improving performance of the rotor.

In one aspect, a technique of fixing permanent magnets of a drive motor rotor for a vehicle may include inserting permanent magnets into a plurality of permanent magnet insertion holes that are formed at a predetermined distance from each other in a circumferential direction of the rotor core, applying magnetic force to the rotor core such that magnetic force is formed in an axial direction (i.e. perpendicular to the plane of the rotor) or a radial direction (i.e. centrifugal) of the rotor core to instantly fix the permanent magnets, and filling the permanent magnet insertion holes with a fixation material to fix the permanent magnets within the permanent magnet insertion holes.

A permanent magnet may be located at a central portion of a permanent magnet insertion hole based on an axial direction, and positioned in an exterior surface or an interior surface of the permanent magnet insertion hole based on a radial direction.

A protrusion may be formed on an interior surface of the permanent magnet insertion hole in order to fix the permanent magnet.

A bent portion may be formed at both ends of an exterior surface of the permanent magnet insertion hole in order to fix the permanent magnet.

Current may be supplied to a magnetic force generator that may be located inside or outside of the rotor core so as to apply the magnetic force to the rotor core.

The fixation material may include an adhesive or a resin.

An exemplary embodiment of the present invention fixes permanent magnets securely to improve durability of a drive motor, and simultaneously improves the efficiency of the drive motor.

An exemplary embodiment of the present invention fixes a permanent magnet via a magnetic force generator, reduces imbalance of a rotor assembly, which improves drive motor efficiency and reduces the requirement for rotor maintenance, and also reduces noise and vibration.

An exemplary embodiment of the present invention fixes permanent magnets at an accurate position to reduce electromagnetic noise (white noise) and electromagnetic ripple, and improves control performance of a motor.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle, that has two or more sources of power, for example both gasoline-powered and electric-powered vehicles.

Figure 1:
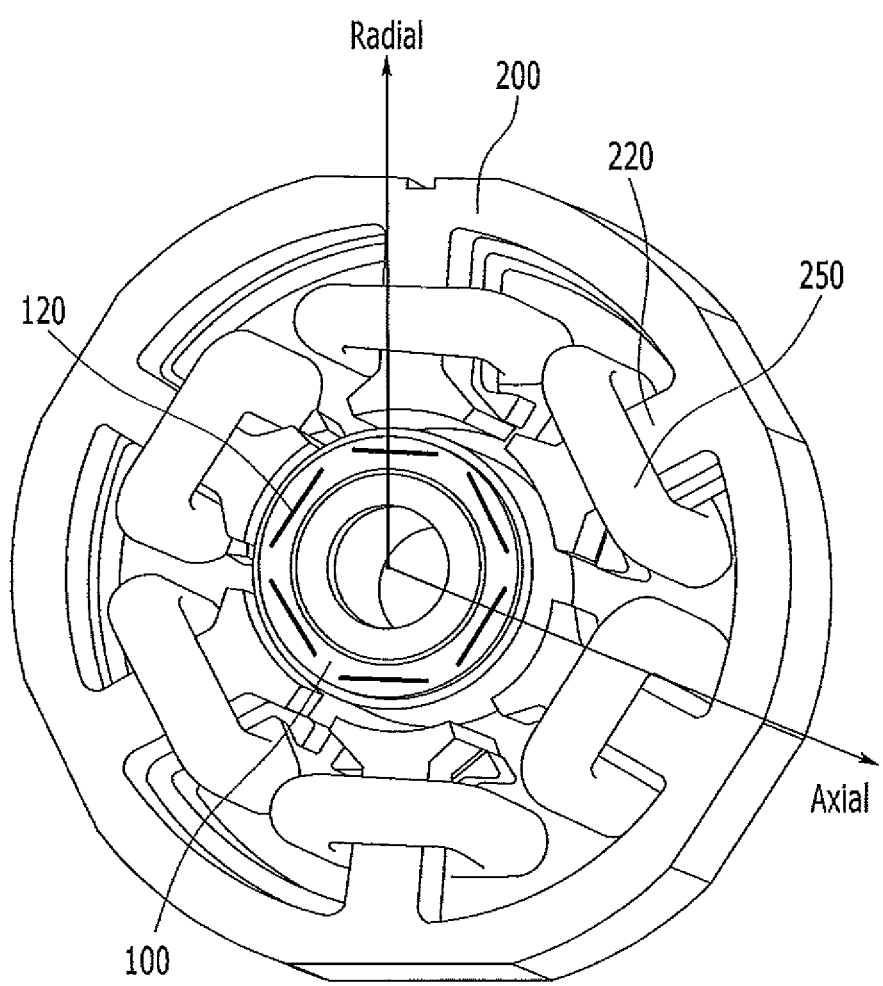
FIG. 1 is a perspective view of a device showing a method of fixing a permanent magnet according to an exemplary embodiment of the present invention.

FIG. 1 is a perspective view of a device used for a technique of fixing a permanent magnet according to an exemplary embodiment of the present invention. Referring to FIG. 1, a circular magnetic force generator 200 is disposed outside a rotor core 100, and a permanent magnet 120 is inserted into the rotor core 100. The permanent magnet 120 according to an exemplary embodiment of the present invention becomes a permanent magnet by magnetizing a nonmagnetic material.

Hereinafter, a method for fixing a permanent magnet in a rotor of a drive motor that is used in a hybrid vehicle or an electric vehicle will be described.

The rotor core 100 is held by a device such as, for example, a jig, and permanent magnets 120 that are not magnetized are inserted into a plurality of permanent magnet insertion holes 125 that are formed along a circumferential direction of the rotor core 100. After the permanent magnets 120 are inserted, the magnetic force generator 200 is placed outside or inside the rotor core 100 so as to instantly fix the position of the permanent magnets 120.

The magnetic three generator 200 can be placed either on the inside or outside of the permanent magnet insertion hole 125 in the rotor core 100 and used to fix one permanent magnet 120 at a time. Alternatively, the magnetic force generator 200 may be used to fix all permanent magnets 120 simultaneously, by being placed either on the inside or outside of the rotor core 100.

According to one aspect, the magnetic force generator 200 generates a magnetic flux when a current flows through a coil 250, and when a strong magnetic flux flows through an iron core 220 by current flow, then the permanent magnet 120 is magnetized.

As shown in FIG. 2, the permanent magnets 120 closely contact an interior surface 134 and/or an exterior surface 138 of the plurality of permanent magnet insertion holes 125 that are formed in a circumferential direction at a predetermined distance in the magnetic force generator 200. At the same time, as shown in FIG. 3, the permanent magnets 120 are located in a center portion of the permanent magnet insertion hole 125 in an axial direction. This method is used to instantly fix the permanent magnet 120 before inserting the fixation material.

The current flows through the coil 250 by applying current to the magnetic force generator 200, the permanent magnets 120 are magnetized by the current flowing through the coil 250, and the position of the permanent magnets 120 is fixed instantly by magnetizing the permanent magnets 120.

Figure 2A:
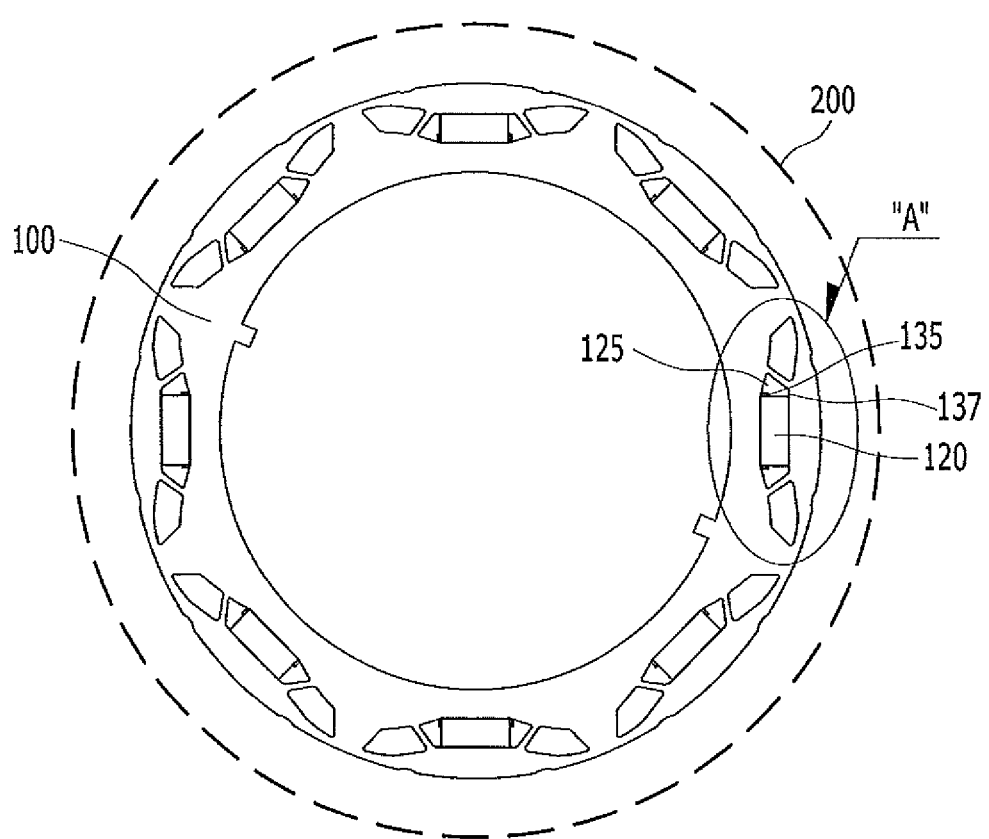
FIGS. 2A-2B and FIGS. 3A-3B are cross-sectional views showing an arrangement of a permanent magnet according to an exemplary embodiment of the present invention.
Figure 2B:
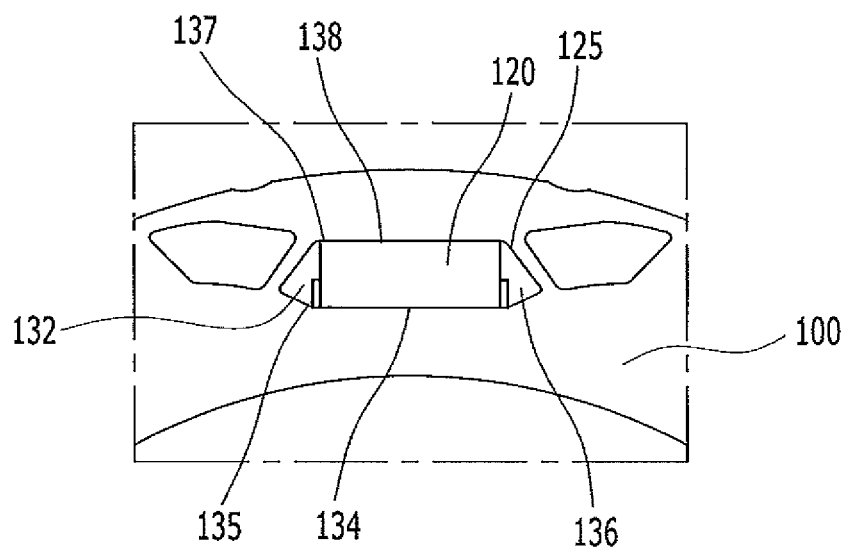

FIG. 2 is a drawing showing an arrangement of a permanent magnet in a radial direction according to an exemplary embodiment of the present invention. FIG. 3 is a drawing showing an arrangement of a permanent magnet in an axial direction according to an exemplary embodiment of the present invention, and hereinafter this invention will be described with reference to FIG. 2 and FIG. 3. FIG. 2A is a cross-sectional view showing an arrangement of a magnetic force generator 200, a rotor core 100, and a permanent magnet 120, and FIG. 2B is an exploded view of a region of rotor core 100 containing a permanent magnet insertion hole 125 showing that a permanent magnet 120 is inserted. FIG. 2 shows a configuration in which the magnetic force generator 200 is disposed outside of the rotor core 100, however, the magnetic force generator 200 can also be placed on the inside of the rotor core 100, or on both the inside and the outside of the rotor core 100.

FIG. 2B shows an embodiment in which the permanent magnet 120 closely contacts the exterior surface 138 of the permanent magnet insertion hole 125, and the adhesive material or the resin material is applied to the interior surface 134 and left/right side surfaces 132 and 136. A protrusion 135 may be formed on the interior surface 134 of the permanent magnet insertion hole 125 to limit the movement of the permanent magnet 120, and/or an angled portion 137 may be formed at both the left side surface 132 and the right side surface 136 of the permanent magnet insertion hole 125 to limit the movement of the permanent magnet 120. The position of the permanent magnet 120 is instantly fixed by the above embodiment.

One of ordinary skill will appreciate that a variety of different types of adhesives or resins may be used to permanently fix the permanent magnet 120 within the permanent magnet insertion hole 125.

Figure 3A:
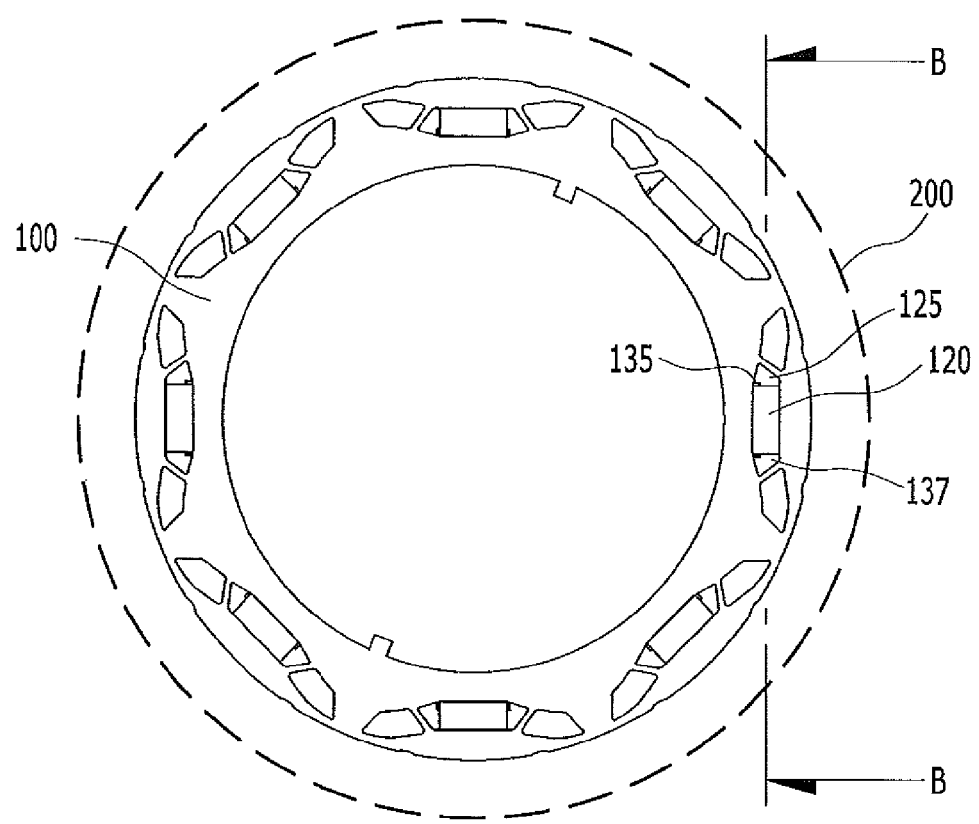
Figure 3B:
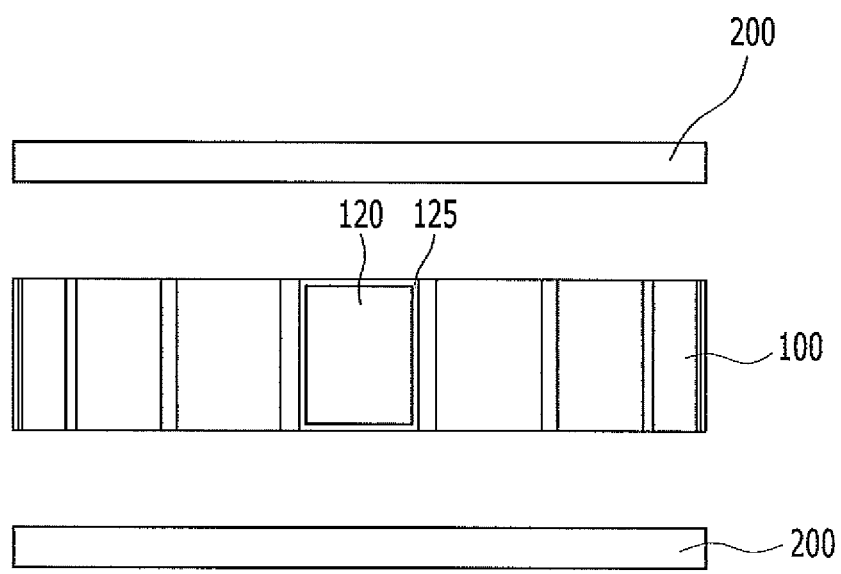

Also, FIG. 3B shows a cross-sectional view along B-B of FIG. 3A, wherein the magnetic force generator 200 is placed at an upper portion and a lower portion of the permanent magnet 120, relative to the axial direction, such that the permanent magnet 120 is positioned at a central location, relative to the axial direction, of the permanent magnet insertion hole 125. That is, the permanent magnet 120 is axially centered within the permanent magnet insertion hole 125 of the rotor core 100.

As described above, the permanent magnet 120 is fixed by the magnetic force generator 200 to be positioned at a center portion of the permanent magnet insertion hole 125, relative to either the axial direction, the radial direction, or both, and may simultaneously contact the interior surface 134, the exterior surface 138, or both the interior surface 134 and the exterior surface 138, and the adhesive or the resin material is applied in the open space on the left side 132 and the right side 136 of the permanent magnet insertion hole 125. If the permanent magnet 120 closely contacts the interior surface 134, the fixation material (resin or adhesive) is applied on the exterior surface 138, and if the permanent magnet 120 closely contacts the exterior surface 138, the fixation material (resin or adhesive) is applied on the interior surface 134, to securely fix the position of the permanent magnet. If the permanent magnet 120 closely contacts both the interior surface 134 and the exterior surface 138, the fixation material (resin or adhesive) may be applied in the open space applied on the left side 132 and the right side 136 of the permanent magnet insertion hole 125, as well as along the gap between the permanent magnet 120 and the upper and lower surface of the rotor core 100, relative to the axial direction.

The fixation material (such as, e.g., an adhesive or resin) is added after the permanent magnet 120 position has been fixed; however, the order of the inserting the permanent magnet 120 and applying the magnetic force may be changed according to the production technique.

If the permanent magnet 120 is fixed by the above technique, the electrical characteristic may be improved, and the electrical noise may be reduced. Also, the likelihood of an imbalance of the rotor assembly may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: rotor core
120: permanent magnet
125: permanent magnet insertion hole
132: left side surface
134: interior surface
135: protrusion
136: right side surface
137: bent portion
138: exterior surface
200: magnetic force generator
220: iron core
250: coil

What is claimed is:

1. A method for fixing a position of a permanent magnet within a drive motor rotor for a vehicle, comprising:
   inserting a plurality of non-magnetized permanent magnets into a plurality of permanent magnet insertion holes that are formed at a predetermined distance from each other in a circumferential direction of a rotor core;
   first adjusting the position of the permanent magnets within the permanent magnet insertion holes by applying magnetic force to the rotor core with a magnetic force generator, wherein the magnetic force is formed in a direction relative to the rotor core and magnetizes the permanent magnets; and
   after adjusting, adding a fixation material to the permanent magnet insertion holes, thereby fixing the position of the permanent magnets.

2. The method of claim 1, wherein the magnetic force is formed in an axial direction of the rotor core.

3. The method of claim 1, wherein the magnetic force is formed in a radial direction of the rotor core.

4. The method of claim 1, wherein the magnetic force is formed in an axial direction and a radial direction relative to the rotor core.

5. The method of claim 1, wherein the plurality of permanent magnets are centrally positioned within the plurality of permanent magnet insertion holes relative to an axial direction.

6. The method of claim 1, wherein the plurality of permanent magnets are positioned on an exterior surface of the permanent magnet insertion holes relative to a radial direction.

7. The method of claim 6, wherein a protrusion is formed on the exterior surface of the permanent magnet insertion holes to fix the permanent magnets.

8. The method of claim 1, wherein the plurality of permanent magnets are positioned on an interior surface of the permanent magnet insertion holes relative to a radial direction.

9. The method of claim 8, wherein a protrusion is formed on the interior surface of the permanent magnet insertion holes to fix the permanent magnets.

10. The method of claim 1, wherein the plurality of permanent magnets are positioned on an exterior surface and an interior surface of the permanent magnet insertion holes relative to a radial direction.

11. The method of claim 10, wherein a protrusion is formed on the interior surface and the exterior surface of the permanent magnet insertion holes to fix the permanent magnets.

12. The method of claim 1, wherein the plurality of permanent magnets are centrally positioned within the plurality of permanent magnet insertion holes relative to an axial direction, and positioned on an exterior surface or an interior surface of the permanent magnet insertion holes relative to the radial direction.

13. The method of claim 1, wherein a circumferentially oriented angled portion is formed at both ends of an exterior surface of the permanent magnet insertion holes to fix the permanent magnets.

14. The method of claim 1, wherein current is supplied to the magnetic force generator so as to apply the magnetic force to the rotor core.

15. The method of claim 14, wherein the magnetic force generator is placed outside of the rotor, relative to the radial direction.

16. The method of claim 14, wherein the magnetic force generator is placed inside of the rotor, relative to the radial direction.

17. The method of claim 14, wherein the magnetic force generator is placed inside and outside of the rotor, relative to the radial direction.

18. The method of claim 14, wherein the magnetic force generator is placed above and below the rotor, relative to the axial direction.

19. The method of claim 1, wherein the fixation material is selected from the group consisting of an adhesive and a resin.

20. The method of claim 19, wherein the fixation material is an adhesive.

* * * * *